United States Patent
Waithe et al.

(10) Patent No.: US 6,351,603 B2
(45) Date of Patent: Feb. 26, 2002

(54) AUTOMATIC WATER HEATING SYSTEM

(75) Inventors: Kenrick A. Waithe; Ivan G. Arzy, both of Hampton, VA (US)

(73) Assignee: Arwa Technologies, Inc., Mableton, GA (US)

( * ) Notice: Subject to any disclaimer, the term of this patent is extended or adjusted under 35 U.S.C. 154(b) by 0 days.

(21) Appl. No.: 09/742,353

(22) Filed: Dec. 22, 2000

Related U.S. Application Data

(60) Provisional application No. 60/187,987, filed on Mar. 9, 2000.

(51) Int. Cl.[7] .................................................. F24H 1/10
(52) U.S. Cl. ........................ 392/474; 392/475; 392/465
(58) Field of Search ................................ 392/465, 474, 392/476, 498

(56) References Cited

U.S. PATENT DOCUMENTS

| | | | |
|---|---|---|---|
| 4,567,350 A | 1/1986 | Todd, Jr. ..................... | 219/298 |
| 4,713,525 A | 12/1987 | Eastep ........................ | 219/308 |
| 4,970,373 A | 11/1990 | Lutz et al. ................... | 219/497 |
| 5,020,127 A | 5/1991 | Eddas et al. ................. | 392/488 |
| 5,408,578 A | 4/1995 | Bolivar ........................ | 392/490 |
| 5,479,558 A | 12/1995 | White, Jr. et al. .......... | 392/490 |
| 5,504,306 A | 4/1996 | Russell et al. .............. | 219/497 |

Primary Examiner—Teresa Walberg
Assistant Examiner—Thor Campbell
(74) Attorney, Agent, or Firm—Richard C. Litman

(57) ABSTRACT

A remote control tankless water heater system that obviates the need to mix hot and cold water in a sink, faucet, shower, etc. In one embodiment, there is a key pad control system, including preset buttons which serve as a memory for storing optimal user temperatures, automatic troubleshooting, and scald protection. In another embodiment conventional-appearance mixing knobs are employed. In addition to controlling the water temperature, the knobs also control the flow of water in the system, but they do not control temperature and flow in the conventional manner. The user thinks that he or she is mixing hot and cold water when turning knobs to obtain the desired temperature and flow rate. In actuality, the temperature and flow rate are guided by a microprocessor, and they are based upon the ratio of rotation between the two knobs and the aggregate rotation of the knobs, respectively.

4 Claims, 6 Drawing Sheets

AUTOMATIC WATER HEATING SYSTEM

CROSS-REFERENCE TO RELATED APPLICATION

This application claims the benefit of U.S. Provisional Patent Application Ser. No. 60/187,987, filed Mar. 9, 2000.

BACKGROUND OF THE INVENTION

1. Field of the Invention

The present invention relates generally to a water heating control system, and more specifically, to a microprocessor-based system for controlling the temperature and increasing the energy efficiency of lavatory sinks, showers, baths, etc.

2. Description of the Related Art

Conventional tankless water heaters can heat water precisely to desired temperatures, but this temperature is typically set locally, at the tankless water heater, and typically at 140 degrees F. The user must then mix cold water with the heated water to obtain the desired user temperature. This is a waste of energy and is inefficient. To counteract this, the inventions disclosed in U.S. Pat. No. 4,713,525 issued in April 1996 to Russell et al. and U.S. Pat. No. 5,504,306 issued in December 1987 to Eastep use a microprocessor based remote control pad to heat water to the desired user temperature without mixing. The problem with these devices is that they do not have preset buttons to serve as a memory for storing optimal temperatures, nor do they have diagnostic or troubleshooting capabilities. Moreover, Eastep and Ressell et al. do not provide a device combining the efficiency and precision of electronic temperature control with the charming familiarity of hot and cold conventional water knobs.

Other patent which have some relevance to the present invention include: U.S. Pat. No. 5,479,558 issued in December 1995 to White, Jr., et al., describing a flow-through tankless water heater with a flow switch and a heater control system; U.S. Pat. No. 5,020,127 issued in May 1991 to Eddas et al., describing a tankless electric water heater; and U.S. Pat. No. 4,970,373 issued in November 1990 to Lutz et al., describing an electronic temperature control system for a tankless water heater.

None of the above inventions and patents, taken either singly or in combination, is seen to describe the instant invention as claimed.

SUMMARY OF THE INVENTION

This invention is a remote control tankless water heater system. The purpose of this invention is to obviate the need to mix hot and cold water in a sink, faucet, or shower, which is inefficient and wasteful. In one embodiment, there is a key pad control system, including preset buttons which serve as a memory for storing optimal user temperatures for up to six people, automatic troubleshooting diagnostics, and scald protection. In another embodiment, conventional knobs, instead of a key pad, are used to control the water temperature and flow rate.

Once a key pad selection is made, the microprocessor does a diagnostic check of the whole system. A thermistor, located near a water heater outlet, monitors the outlet temperature of the water en route to the faucet. The change in resistance of the thermistor is measured and translated into a temperature. The microprocessor then compares this temperature to the temperature selected by the user. The second embodiment of the tankless water heater system also includes a water heater assembly, and a user interface. However, instead of having a key pad control panel, conventional mixing knobs such as those used with showers, kitchen sinks, lavatory sinks, etc., are employed. In addition to controlling the water temperature, the knobs also control the flow of water in the system but not in the conventional manner. The user thinks that he or she is mixing hot and cold water when turning knobs to obtain the desired temperature and flow rate. In actuality, the temperature and flow rate are guided by a microprocessor, and they are based upon the ratio of rotation between the two knobs and the aggregate rotation of the knobs, respectively.

Accordingly, it is a principal object of the invention to improve the energy efficiency and the reliability of residential and commercial water outlets.

It is another object of the invention to provide an electronic mechanism that enhances water conservation.

It is a further object of the invention to modernize water faucets, while retaining their charm and antiquity.

It is yet another object of the invention to prevent freezing and/or scalding temperatures, and to thus prevent epidermal injuries.

It is an object of the invention to provide improved elements and arrangements thereof in an apparatus for the purposes described which is inexpensive, dependable and fully effective in accomplishing its intended purposes. These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 5:
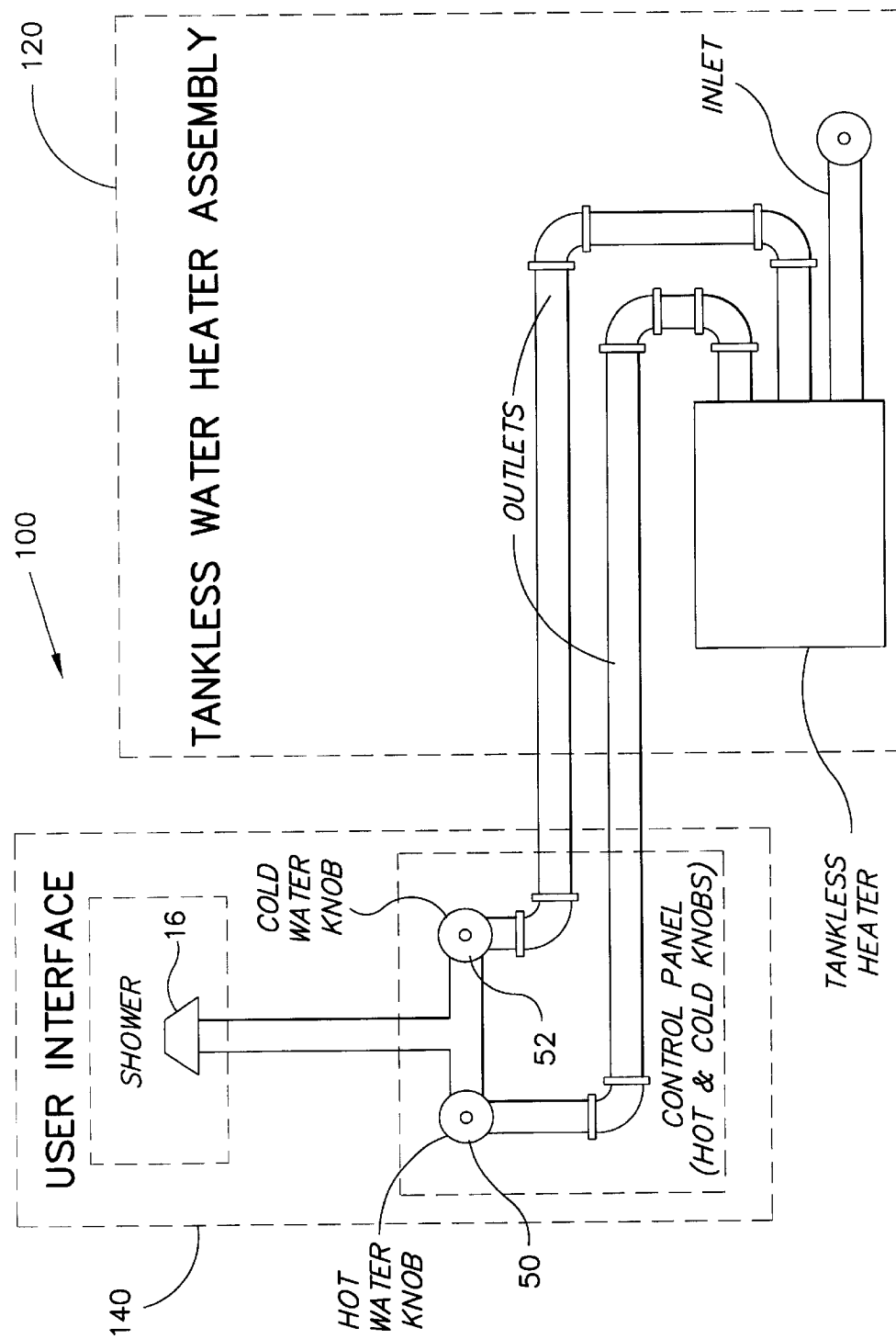
FIG. 5 is an environmental perspective view of a tankless water heater assembly, and user interface having a control panel utilizing a mixing knob input.
Figure 6:
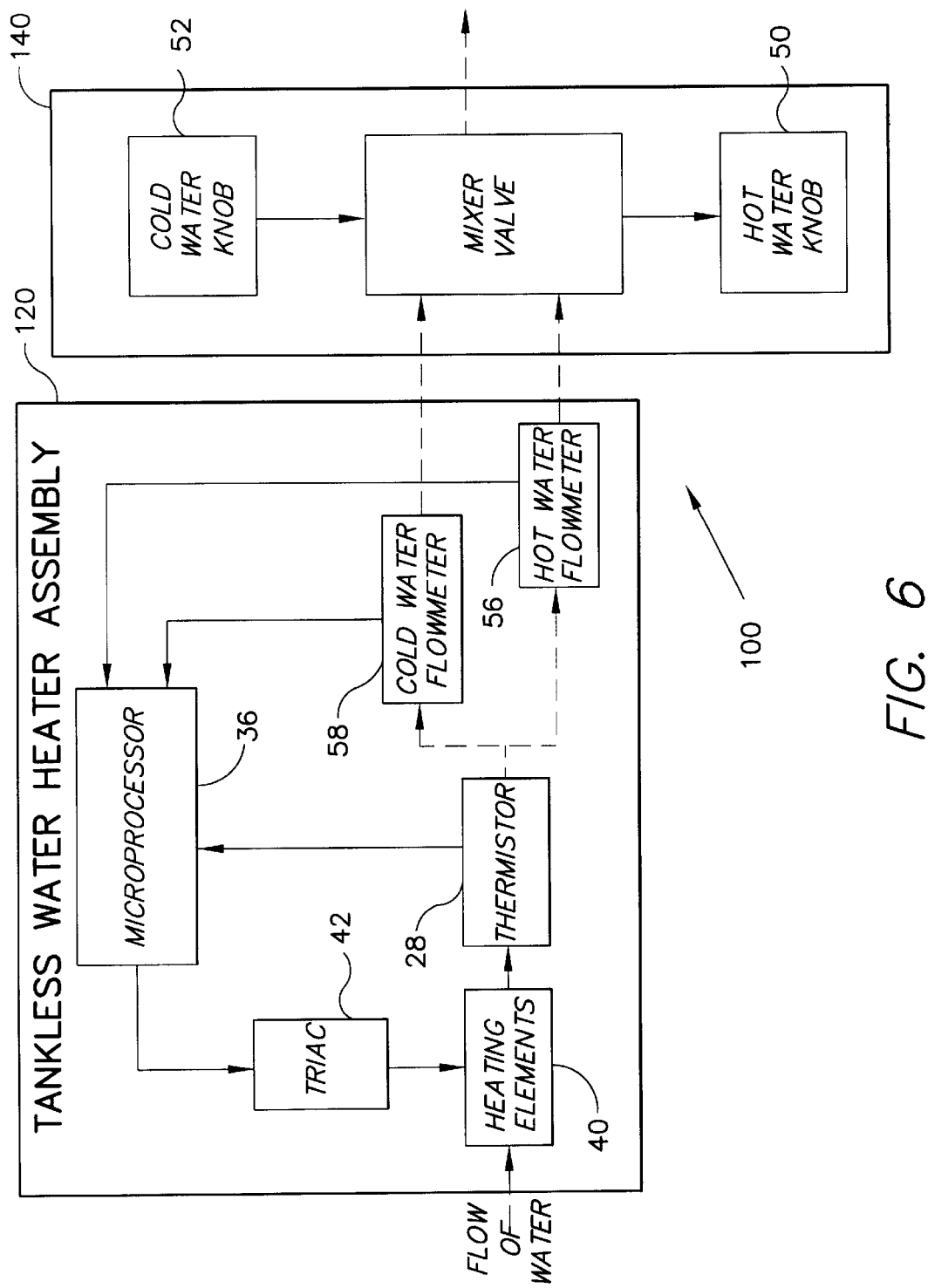
FIG. 6 is a block diagram showing further detail of the assembly & user interface of FIG. 5.

The present invention deals with the remote control of a tankless water heater. Referring to the drawings, FIGS. 1–4 are directed to a first embodiment that employs a user-controlled key pad that dictates water temperature and flow rate. FIGS. 3, 5 and 6 are directed to a second embodiment that utilizes existing faucet knobs, instead of a key pad to achieve the same results.

In the first embodiment, temperature is controlled by a key pad linked to a microprocessor. The microprocessor activates heating elements which heat the water to the desired temperature. In the second embodiment, temperature is controlled not by a key pad, but by regular hot and cold knobs that are modified to send signals to the microprocessor, where the signals are determined by the relative rotation of the hot and cold knobs. This is different from the hot and cold knobs of conventional faucets, where the final water temperature is achieved by mixing and controlling the flow rates of the respective hot and cold water. Thus, the present invention's hot and cold knobs control temperature not by mixing relative amounts of hot and cold water, but rather by measuring the relative rotation of each of the hot and cold temperature knobs, and by then translating that measurement into a signal which activates heating elements that operate to deliver precisely the desired water temperature. In this manner, energy efficiency is maximized while maintaining the appearance and charm of the conventional faucet. An important difference between the first and second embodiment is that the first embodiment key pad has the additional functionality of preset buttons which serve as a memory for storing optimal user temperatures. The first embodiment also has diagnostic/troubleshooting capabilities that can be viewed on a liquid crystal display. Displayed diagnostic data includes information on the proper functioning of the tankless water heater assembly and of the control panel.

Figure 1:
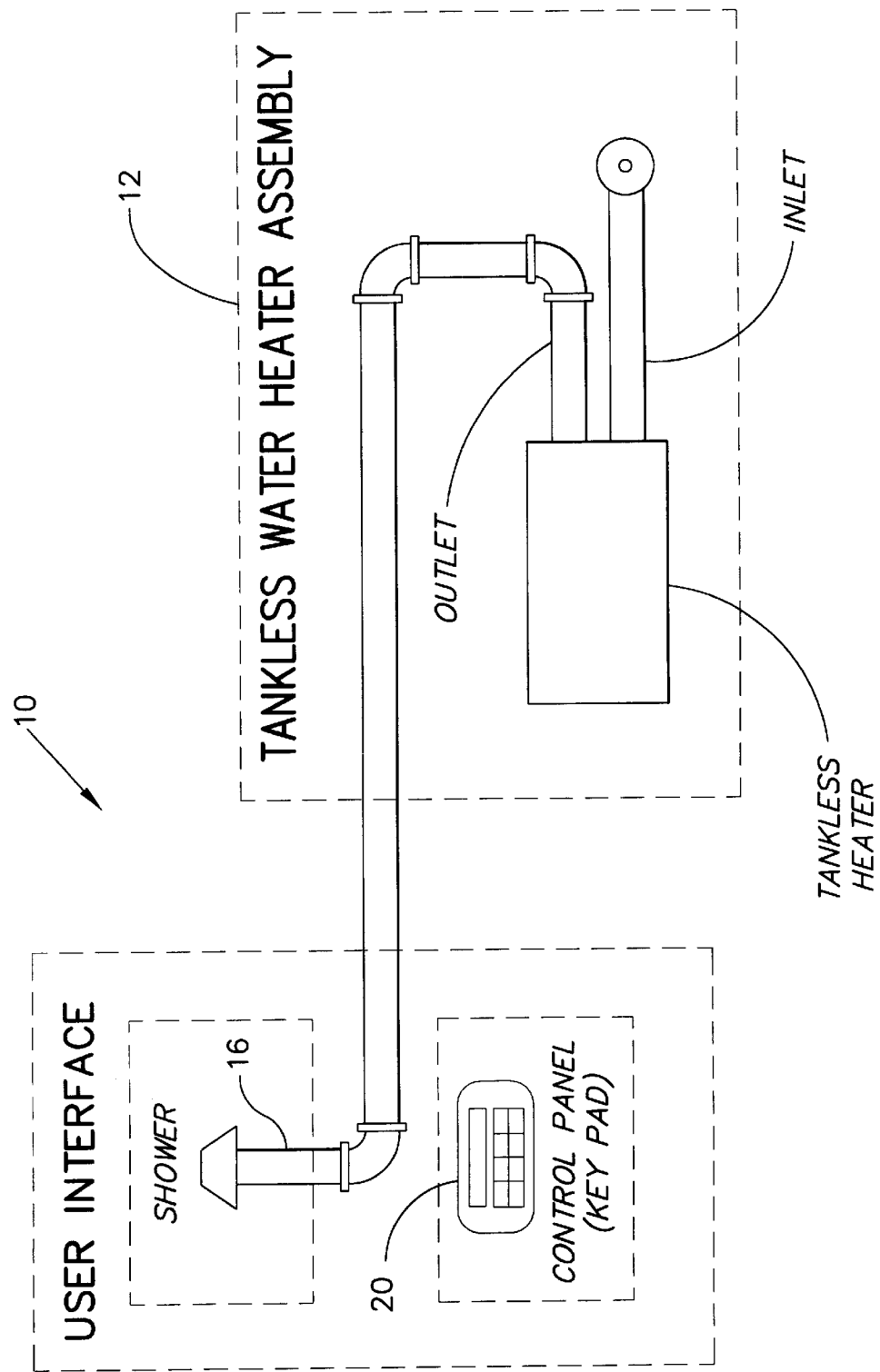
FIG. 1 is a block diagram of a tankless water heater assembly, and user interface having a control panel key pad input.

FIG. 1 is a block diagram of a first embodiment of a tankless water heater system 10, comprising a tankless water heater assembly 12, and a user interface 14. In the first embodiment, shown in FIG. 1, the control panel is a key pad 20. Key pad 20 is mounted in any appropriate way to a wall proximate to water dispenser 16. As shown in FIG. 1, water dispenser 16 is a shower. Of course, water dispenser 16 could be nearly any kind of water dispensers, including kitchen or lavatory faucets, etc.

The temperature of water exiting from dispenser 16 is remotely controlled using a closed loop, proportional, integral and differential (PID) algorithm, shown in FIG. 3. In pertinent part, FIG. 3 illustrates a generic control system algorithm having an optional digital input means—i.e., comprising a key pad.

Figure 4:
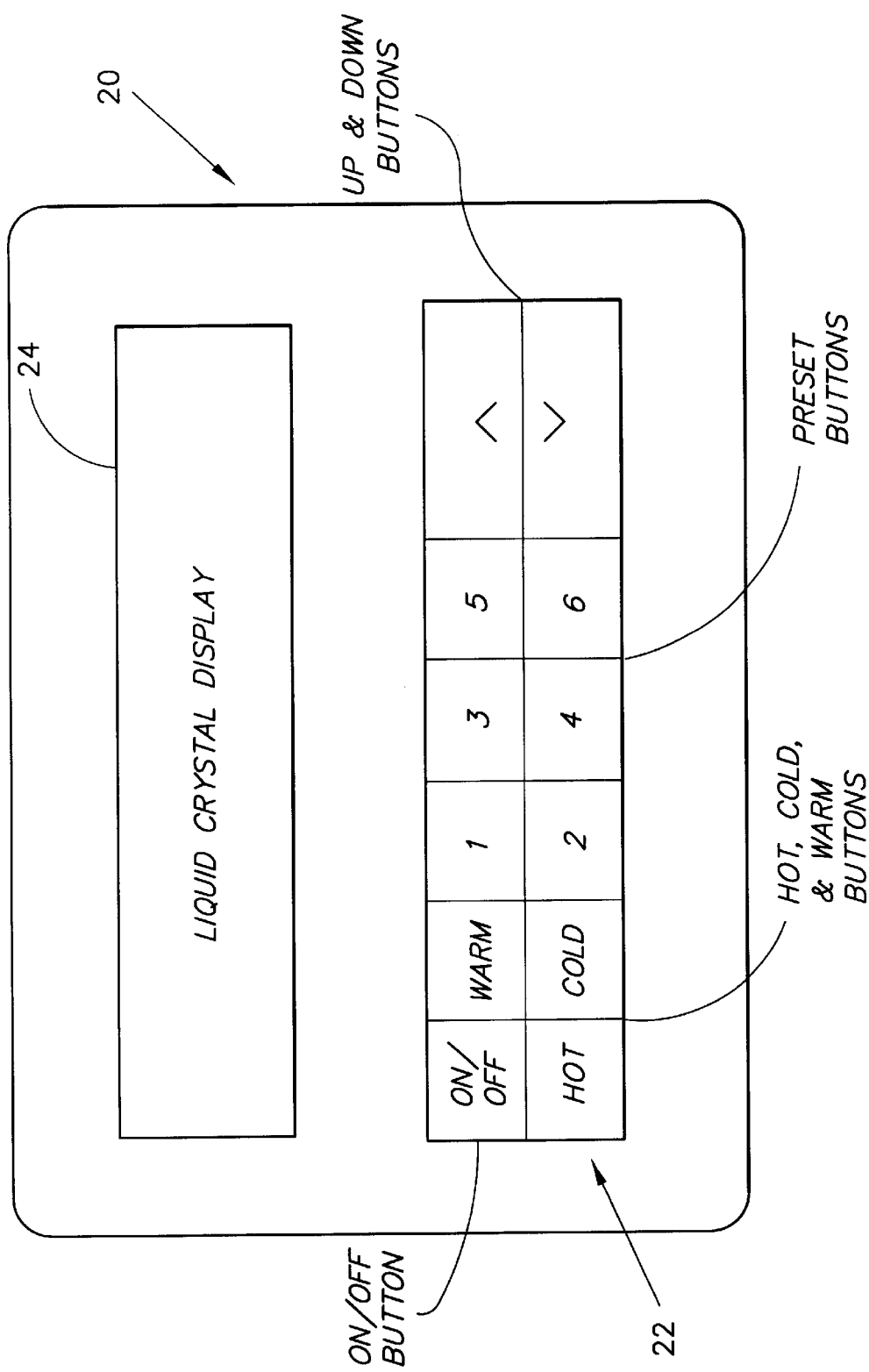
FIG. 4 is a plan view of the key pad referenced in FIGS. 1, 2 & 3.

Referring to FIG. 4, key pad 20 will control, among other things, the flow and the temperature of the water. Key pad 20 is preferably waterproof and mounted inside the shower, as the case may be, or over the sink of a lavatory or kitchen faucet. The control panel of the preferred embodiment has a liquid crystal display (LCD) 24 to display user information, and a series of buttons 22 including: an ON/OFF button; hot, warm, and cold buttons; and up and down buttons to increase or to decrease the water temperature. In addition, each of up to six users can preset their hot, warm, and cold temperatures by using one of the individual "PRESET BUTTONS" 1 through 6. The preset temperatures are stored in electronically erasable programmable read only memory (EEPROM). The control panel will also have scald protection—i.e., the microprocessor in the control panel will have a pre-programmed temperature limit of 120 degrees F., to avoid scalding. The control panel, or key pad 20 will also control the flow of the water by activating a solenoid valve to start or to stop flow. Lastly, the control panel will display diagnostic information to the user via the LCD to help the user identify which aspect of the water heating system has failed in the event of a failure.

Figure 2:
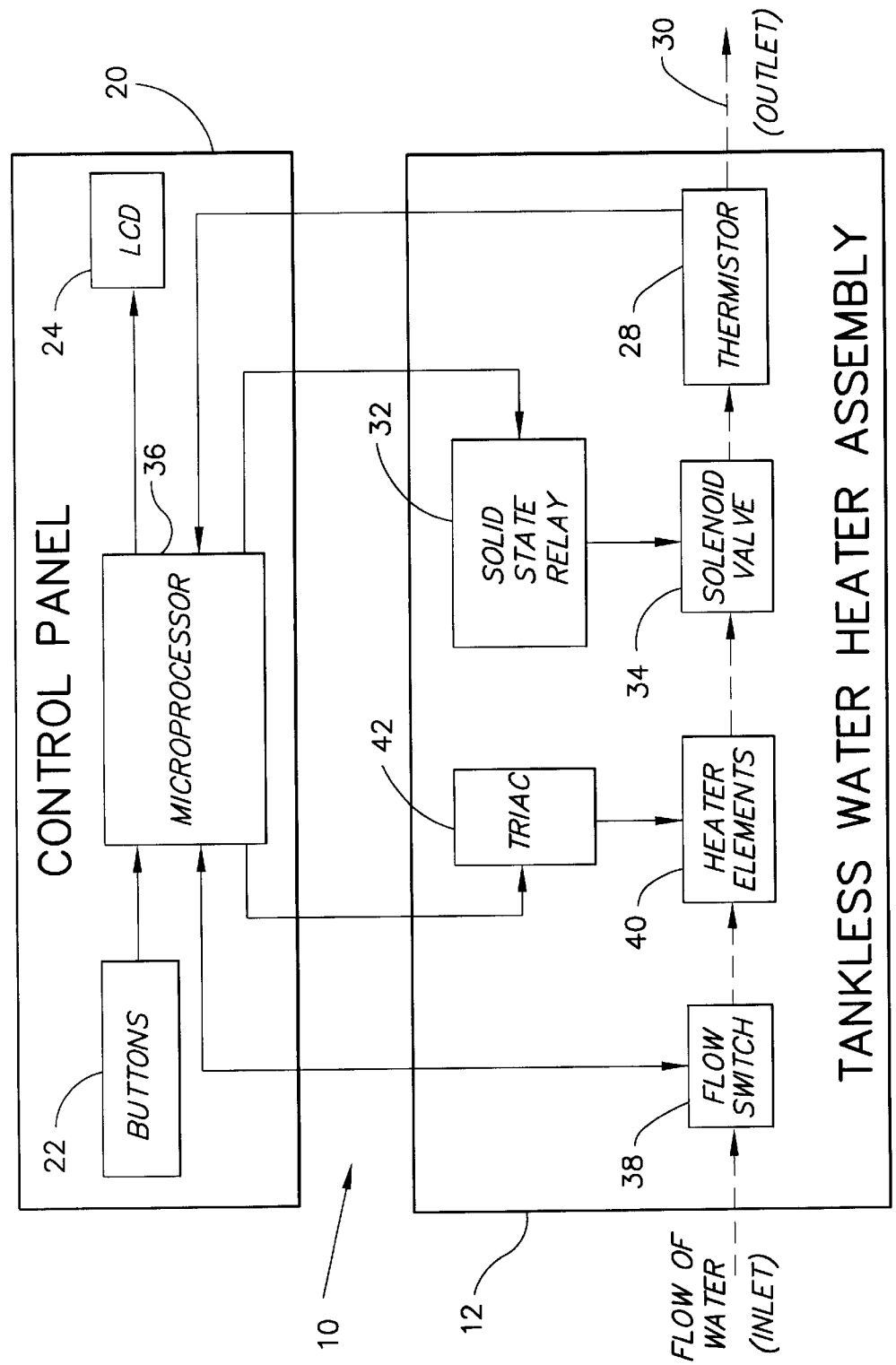
FIG. 2 is a block diagram showing further detail of the assembly and user interface of FIG. 1.
Figure 3:
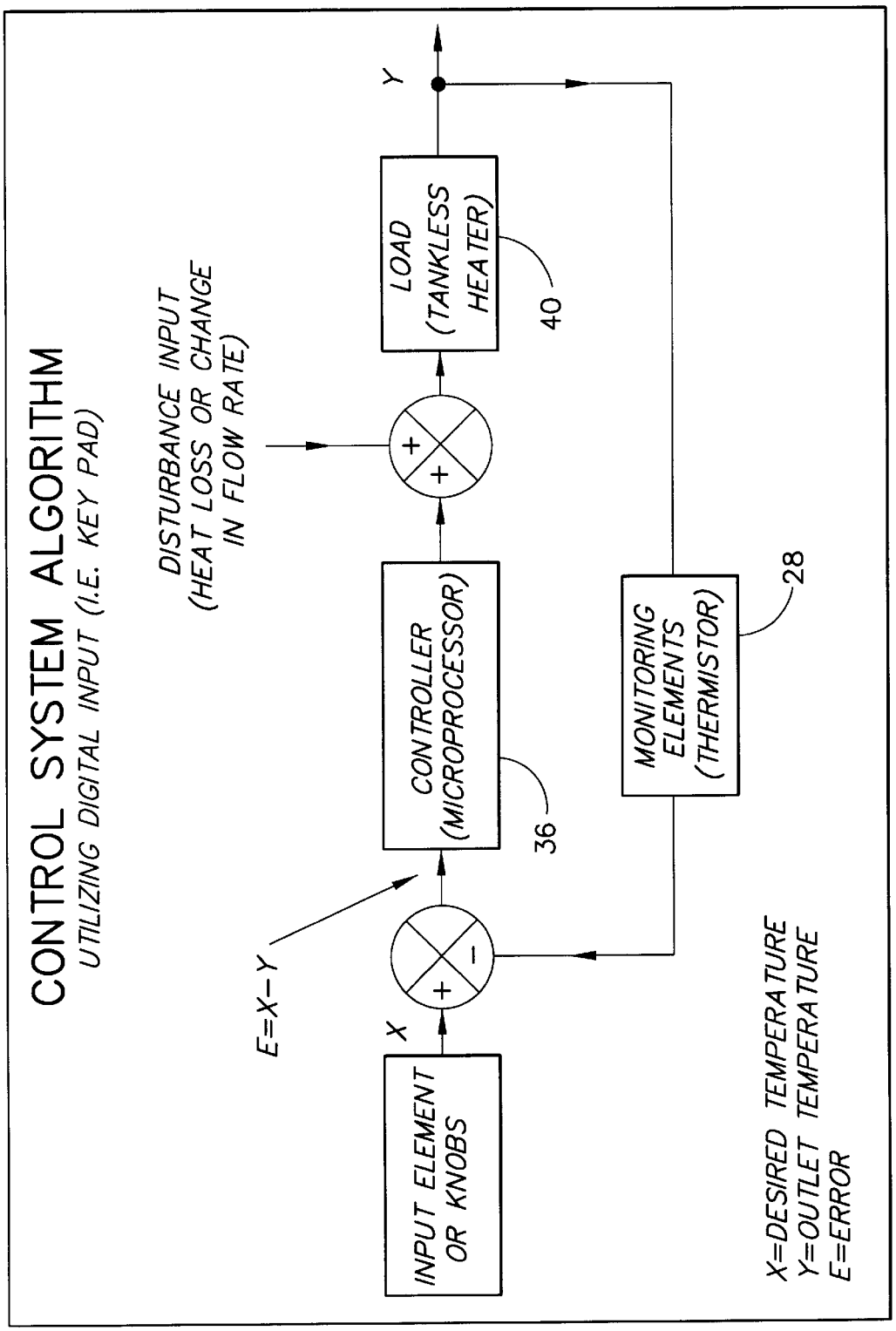
FIG. 3 is a schematic representation of a closed loop control system algorithm utilizing optional input—i.e., mechanical (hot & cold mixing knobs), or digital (key pad) input.

FIG. 2 is a block diagram showing further detail of the water heater assembly and user interface of FIG. 1. To start the system, the user can either press the on/off button, or press his or her preset button followed by the hot, warm, or cold button. If the on/off button is selected, microprocessor 36 reads in a default value of 80 degrees F. from the electronically erasable programmable read only memory (EEPROM), and displays it on the liquid crystal display (LCD) 24, shown in FIG. 4. If, on the other hand, a preset button is depressed, the microprocessor reads in a stored preset value programmed from the selected hot, warm, or cold button, and displays it on LCD 24. Once a selection is made, microprocessor 36 does a diagnostic check of the whole system. It first does a self diagnostic to ensure that the components of the computer chip have not been corrupted. It then checks to see if thermistor 28, shown in each of the alternate embodiments of FIGS. 2 and 6, is measuring logical temperatures. The purpose of thermistor 28 is to measure the water temperature at outlet 30 of water heater assembly 12 in FIG. 2, or of assembly 120, in FIG. 6. If any part of this diagnostic process fails, an error message will appear on LCD 24, identifying which component has failed, and the system discontinues any further action. If the system passes the diagnostic test, the microprocessor sends a +5 volts to activate solid state relay 32 which activates solenoid valve 34. Once solenoid valve 34 has been activated, microprocessor 36 monitors flow switch 38 to check for flow. If no flow is present, an error message is displayed to the user, informing the user that there is no flow. Flow switch 38 is a heater element protection device. If there is low flow or no water flow, heater element 40 would otherwise burn up. Note that heater element 40 is described as "LOAD" in FIG. 3. The system will continue to display this error message and suspend any further actions until flow is present. Once flow is present, the microprocessor employs the PID algorithm and sends a pulse width modulated (PWM) square wave that switches between ground and +5 volts, representative of the desired user temperature. This pulse is sent to a power switching device, preferably a TRIAC TM 42, to power heater elements 40. Thermistor 28, located proximate outlet 30, monitors the temperature of the water en route to user interface 14. The change in resistance of thermistor 28 is measured by microprocessor 36 and is then translated into a temperature. Microprocessor 36 then compares the measured temperature at outlet 30 to the desired temperature, as keyed into key pad 20. These values are then read into the PID algorithm in order to make corrections to the PWM wave sent to TRIAC 42.

Another aspect of the diagnostic phase is to ensure that heating elements 40 are working. This is accomplished by first storing in the EEPROM, as a reference temperature, the measured temperature at outlet 30 before power is applied to heating elements 40. The outlet temperature after power has been applied is then compared to the outlet temperature before power is applied. If there is no change between the two temperatures, the system displays a command to check the heating elements, but continues operation. If there is a change, the microprocessor then stores in the EEPROM the new outlet temperature, as the reference temperature, and uses this temperature to compare against the outlet temperature in the event that additional power is added to heating elements 40. In addition, microprocessor 36 ensures that the outlet temperature does not go above 120 degrees F. If the temperature is approaching 120 degrees F., the system reduces power to heating (or heater) elements 40 until the outlet temperature is stable at 120 degrees F. During this process, microprocessor 36 continuously monitors flow switch 38 and buttons 22 for any changes to the system. If a no flow condition occurs at any time during system use, the system displays an error message to the user via LCD 24 and shuts off power to heating elements 40 until flow is present. If the user changes the temperature, the new temperature is displayed and the new input temperature is read into the PID algorithm. To stop the system, the user presses the ON/OFF button shown in FIG. 4.

FIG. 5 is a second embodiment of a tankless water heater system 100 comprising a water heater assembly 120, and a user interface 140 having a control panel utilizing a mixing knob input. In this second embodiment, a variation of conventional mixing knobs, such as those used with showers, kitchen sinks, lavatory sinks, etc., are employed. Knobs 50 and 52, in conjunction with microprocessor 36, is used to remotely control the water temperature using a closed loop, proportional, integral and differential (PID) algorithm, again, as shown in FIG. 3. In addition, system 100 has scald protection—i.e., the microprocessor will have a pre-programmed temperature limit of 120 degrees F. to avoid scalding. In pertinent part, FIG. 3 accompanies FIG. 5 and FIG. 6 in that FIG. 3 is a control system algorithm having an optional mechanical input—i.e., comprising hot and cold knobs 50 and 52. In addition to controlling the water temperature, knobs 50 and 52 will also control the flow of water in system 100. Water dispenser 16 of interface 140 essentially tricks the user. That is, the user thinks that he or she is mixing hot and cold water when turning knobs 50 and 52 to obtain the desired user temperature and flow. In actuality, knobs 50 and 52 do not lead to the mixing of hot and cold water. In fact, what happens is that system 100 measures the user's relative rotation of the hot and cold knobs, in order to establish a ratio of rotation between the two knobs. That ratio of rotation then translates to a desired temperature. The aggregate rotation, on the other hand, translates into the flow rate. Thus, the second embodiment will appear to the user to be working the same way as a conventional mixing faucet when in fact there is no mixing of hot and cold water at all.

FIG. 6 is a block diagram showing further details of water heater assembly 120 and user interface 140 of FIG. 5. FIG. 6 is similar to FIG. 2 of the first embodiment, but is missing the solid state relay and the solenoid valve. Also, FIG. 6 adds a hot water flow meter 56, and a cold water flow meter 58. Knobs 50 and 52 are used in place of key pad 20. To start system 100, the user opens either or both of knobs 50 and 52. Once system 100 is started, microprocessor 36 does a diagnostic check of the system. It first does a self check to ensure that the components of the chip have not been corrupted. It then checks to see if thermistor 28 is measuring logical temperatures. Lastly, the microprocessor monitors flow meters 56 and 58 to determine if flow is present. If any part of this diagnostic process fails, the system discontinues any further action, except the user can still receive cold water. If system 100 passes the diagnostic test, then the flow rate demanded by the user, as a function of the turning of the knobs, is measured by flow meters 56, 58. Based upon this flow rate, meters 56 and 58 then send a signal to microprocessor 36 which translates into hot and cold water flow rates. The ratio of flow rates translates into the desired water temperature. The microprocessor then employs the PID algorithm to send a PWM wave to TRIAC 42 in order to control heating elements 40. Thermistor 28, again, monitors the outlet temperature.

Referring to FIG. 6, the change in resistance of thermistor 28 is measured by microprocessor 36 and translated into a temperature. The microprocessor then compares this temperature to the desired outlet temperature. The differential is then read into the PID algorithm to make corrections to the PWM wave sent to TRIAC 42. In addition, microprocessor 36 ensures that the outlet temperature does not go above 120 degrees F. If the temperature is approaching 120 degrees F., the system reduces power to heating elements 40 until the outlet temperature is stable at 120 degrees F. During this process, the microprocessor continuously monitors flow meters 56 and 58 for any changes. If a no flow condition occurs anytime during system use, the system shuts off power to heating elements 40 until flow is present. If the user adjust the knobs to change the temperature or flow rate, the new temperature or flow rate is read into the PID algorithm of FIG. 3. To stop the system, the user turns off both knobs 50 and 52.

It is to be understood that the present invention is not limited to the embodiments described above, but encompasses any and all embodiments within the scope of the following claims.

We claim:

1. A remote control tankless water heater system, comprising:

a control panel including a hot water knob and a cold water knob and a mixer valve between said cold water knob and said hot water knob;

a water dispenser proximate said control panel, each said knob connected to said water dispenser; and a tankless water heater assembly including:
an inlet and an outlet opposite said inlet;
heating elements between said inlet and said outlet;
a power switching device controlling the temperature of said heating elements;
a water flow measuring device; and
a thermistor proximate said heating elements;

wherein said cold water knob, said hot water knob, and said mixer valve determine the flow rate and the temperature of a single stream of water exiting said water dispenser without the mixing of cold and hot water.

2. The remote control tankless water heater system according to claim 1, wherein said control panel further comprises:

a microprocessor;

preset buttons that signal said microprocessor; and a liquid crystal display that displays information processed by said microprocessor.

3. The remote control tankless water heater system according to claim 2, wherein said assembly further comprises:

a solid state relay;

a solenoid valve that acts in conjunction with said relay to control flow rates.

4. The remote control tankless water heater system according to claim 1, wherein said assembly further comprises:

a microprocessor wired to each of said power switching device, said water flow measuring device, and said thermistor; and a cold water flow meter and a hot water flow meter, each said meter wired to said microprocessor, each said meter adjacent to and downstream from said thermistor, and each said meter upstream from and adjacent to said mixer valve.

* * * * *